United States Patent
Vehrs, Jr.

[11] 3,737,900
[45] June 5, 1973

[54] DIGITAL DOPPLER PROCESSOR

[75] Inventor: Charles L. Vehrs, Jr., Anaheim, Calif.

[73] Assignee: North American Rockwell Corporation, El Segundo, Calif.

[22] Filed: Sept. 25, 1967

[21] Appl. No.: 670,363

[52] U.S. Cl.............343/7 A, 343/5 CM, 343/5 DP, 343/7.7, 343/17.1 R
[51] Int. Cl................................................G01s 9/42
[58] Field of Search.................343/5 DP, 5 CM, 7 A, 343/7.7, 17.1 R

[56] References Cited

UNITED STATES PATENTS 3,346,859  10/1967  Mullins et al..........................343/7.7

*Primary Examiner*—T. H. Tubbesing
*Attorney*—William R. Lane, L. Lee Humphries and Rolf M. Pitts

[57] ABSTRACT

In a multi-mode pulsed energy system adapted for airborne operation, a range-gated doppler processor utilizing digital integral filter means. The digital integral filter means computes the power spectral density of received signals for each of a plurality of discrete doppler frequencies, corresponding to a doppler pass band of interest. Use of such digital technique allows convenient phase and frequency compensation of the doppler processor for changes in system look-angle, altitude and platform motion in a selected one of a high resolution ground mapping, squint, coherent AMTI and noncoherent AMTI mode of a multi-mode radar system.

9 Claims, 20 Drawing Figures $$f_1 = \frac{2V_a}{\lambda}\cos\phi_1$$

$$f_2 = \frac{2V_a}{\lambda}\cos(\phi_1 + \Delta\phi)$$

$$f_3 = \frac{2V_a}{\lambda}\cos(\phi_1 + 2\Delta\phi)$$

$$f_j = \frac{2V_a}{\lambda}\cos(\phi_1 + 3\Delta\phi)$$

$$V_T = |V_a|\cos\phi_1 = V_x\cos\phi + V_y\sin\phi$$

INVENTOR.
CHARLES L. VEHRS

BY Rolyn Pitts

ATTORNEY

INVENTOR.
CHARLES L. VEHRS
BY Roy M. Pitts
ATTORNEY $$\Delta R = V_x \frac{n}{PRF} \cos \phi_l + V_y \frac{n}{PRF} \sin \phi_l$$

WHERE: $\Delta t = \frac{n}{PRF}$

INVENTOR.
CHARLES L. VEHRS
BY Roy M. Pitts
ATTORNEY

INVENTOR.
CHARLES L. VEHRS

BY *Rolyn Petts*

ATTORNEY 3,737,900

1

DIGITAL DOPPLER PROCESSOR

CROSS REFERENCES TO RELATED APPLICATIONS

1. U. S. Patent application Ser. No. 275,335 filed Apr. 24, 1963, by R. E. Chandos for Self-Adaptive Controller, now U.S. Pat. No. 3,428,791. 2. U. S. Patent application Ser. No. 391,073 filed Aug. 18, 1964, by F. J. Dynan et al for AMTI Radar System, now U.S. Pat. No. 3,408,647.

3. U. S. Patent application Ser. No. 552,556 filed May 24, 1966, by W. H. Fried et al for Platform Motion Compensation of a Coherent MTI System, now U.S. Pat. No. 3,341,847.

4. U. S. Patent application Ser. No. 615,248 filed Feb. 10, 1967, by J. E. Nolette for Squint Mode Spatial Filter.

5. U. S. Patent application Ser. No. 618,823 filed Feb. 27, 1967, by W. H. McFarland for Range-Gated Digital AMTI System.

6. U. S. Patent application Ser. No. 639,238 filed May 17, 1967, by J. A. Moulton for Range-Gated Moving Target Signal Processor.

BACKGROUND OF THE INVENTION

Doppler-processing has been utilized in pulsed energy systems, such as radar systems, for the selective extraction of data or information from the received echoes of the energy pulses transmitted by such pulsed energy systems. Such processing employs the signals received from a selected range-bin over a preselected number of pulse repetition intervals to observe an amplitude variation occurring over such observation interval within such range bin and corresponding to a doppler shift in the received signal. Where the receiver provides a clutter-referenced video signal due to either coherent or noncoherent processing of received echoes having a substantial clutter content, as is understood in the art, a moving target (moving relative to a clutter reference) may be observed by means of the doppler shift thereof (relative to clutter return). For example, where a noncoherent receiver provides a clutter-referenced video signal, a doppler processor, employing fixed bandpass processing, may be utilized to distinguish a target moving relative to the terrain or clutter source, as taught for example in U. S. application Ser. No. 391,073 filed Aug. 18, 1964, assigned to North American Aviation, Inc., assignee of the subject invention. Where the spectrum of such clutter reference varies or becomes unusually broad, due to changes in the look-angle of an azimuthally scanning system or to changes in the vehicle velocity, it may be desirable to adjust the lower corner frequency of the doppler processor, as taught, for example, in U. S. application Ser. No. 639,238 filed May 17, 1967, and assigned to North American Aviation, Inc.

Although a coherent receiver system may be desired in order to obtain the improved signal performance inherent over a non-coherent receiver, the utilization thereof with a doppler processor in an AMTI system requires compensation for changes in velocity ($V_a$) and look-angle ($\theta$) in accordance with the function $V_a \cos \theta$, in order to obtain a clutter-referenced signal, as explained more fully in application Ser. No. 552,556 filed May 24, 1966, and assigned to North American Aviation, Inc. One method of effecting such compensation is to introduce a frequency shift in the local oscillator signal to one of the receiver mixers. Another type of such form of compensation is shown in U. S. Pat. No. 3,223,997 issued to J. O. Clark et al, for Doppler Correction in a Frequency Diversity Frequency Jittered Pulse Doppler Radar by Means of Digital Phase Computation, and involves the generation of a compensatory phase shift corresponding to that phase shift which the received radar signal has undergone due to target relative motion, the rate of change (radians/second) of such compensatory phase (radians) being referred to in such patent as frequency jitter ($d\phi/dt = \Delta\omega$). The device of Clark, however, provides such compensation for only a single target in a frequency diversity mode of a coherent pulse doppler radar system. In other words, such technique provides the function of a clutter tracker in a coherent AMTI system; and does not provide compensation for a multiple target return representing a plurality of data elements of a range-bin azimuth resolution bin data matrix, such as in a ground-mapping mode.

The doppler processor of above-noted U. S. application Ser. No. 391,073 employs a video signal data matrix comprising a plurality of range-trace signals, which are crossed scanned sequentially for successive range bins. Another type of doppler processor for coherent MTI systems, employing a magnetic drum to record a radar data matrix (plurality of range trace signals) and parallel (simultaneous) read-out of such data for a given range bin, is shown in U. S. Pat. No. 3,127,605 issued to Alderson for Moving Target Radar System. In such arrangement, the in-phase and quadrature coherent-receiver signals for a selected number of range traces are separately recorded, and the read-out signals are then separately preselectively gain-weighted prior to being combined (or integrated), in order to filter out unwanted frequencies, each combination of gain-weighted signals providing a single spectral line of a plurality of spectral lines corresponding to the doppler bandpass of a filter bank. Such analog arrangement, however, does not provide digital processing, and the fixed gain-weighting technique does not allow convenient variations or compensation of the doppler frequencies employed by a limited amount of equipment. Instead, a large filter bank or large plurality of filters is required, which must be selectively switched in order to allow adequate distinction between clutter and a moving target. In other words, such technique does not readily lend itself to effecting doppler processing modes other than moving target indication, and does not include platform motion compensation for so adapting such technique.

Other applications of doppler processing relate to azimuth resolution improvement by distinguishing a selected portion of the clutter spectrum at a selected range from the total spectrum occurring at that range due to the angular extent of the antenna beamwidth, and (in the case of a scanning antenna) due to the change in antenna orientation during the doppler processing interval. An explanation of such application, as related to a squint mode for strip mapping is provided in U. S. application Ser. No. 615,248 filed Feb. 10, 1967, and assigned to North American Aviation, Inc. Another application of such azimuth resolution technique relates to high resolution ground mapping. To effectively so employ doppler processing techniques, it is necessary to effect frequency-focusing or azimuth registration of each terrain point to be mapped by compensation for changes in the doppler shift thereof as viewed by an airborne (moving) radar, due to motion of the radar platform and changes in the target look angle during the doppler processing interval. A data processing system for a synthetic array comprising a side-looking radar, employing a matched filter technique for such focusing, is referred to in U. S. Pat. No. 3,271,765, issued Dec. 19, 1963, to S. R. Pulford for Data Compression System. However, such analog technique requires a large amount of matched filter elements, provides only limited resolution, and relates to only a single doppler processing mode. In other words, such matched filter arrangement does not readily lend itself to providing doppler compensation of other doppler processing modes.

In general, prior art doppler processing techniques have been of limited utility, requiring means for storing and reading out a radar data matrix comprising a plurality of many (often, hundreds) of received range trace signals. Each of such techniques has been directed to a particular application and form of doppler processing, neither being readily adapted to other applications of doppler processing without increases in the amount of equipment required nor readily lending itself to platform motion compensation without additional complexity and inconvenience.

SUMMARY OF THE INVENTION

By means of the concept of the subject invention, an efficient digital doppler processor is provided which does not require the storage of more than one range trace signal and which may be selectively employed in any one of several alternative doppler processing modes. Digital integral filters are employed, the arguments for which may be selectively adjusted to provide that compensation required for a selected mode of system operation.

In accordance with a preferred embodiment of the invention, there is provided a radar system having an intermediate frequency stage coherent receiver having a synchronous detector responsive to a source of an intermediate frequency reference. There is also provided digital doppler processing means for processing signals received by the receiver and comprising digital integral filter means having an input responsively coupled to an output of the synchronous detector. Voltage controlled phase shift means is interposed between the output of the intermediate frequency reference source and an associated input to the synchronous detector. There is also provided compensatory signalling means connected to a control input of the phase shift means for selectively modifying the detector phase reference, and arranged to cooperate with the digital integral filter means for selectively varying the argument thereof.

By means of such arrangement, the need for storing a radar data matrix corresponding to a plurality of range trace signals, is obviated. Also, only a limited number of digital signalling channels are required, the selective variation of the arguments of the digital integral filter means providing any desired degree of platform motion compensation for increasing the level of performance of a selected doppler processing mode, such as high resolution ground mapping, squint mode and coherent AMTI. Accordingly, it is an object of the subject invention to provide an improved digital doppler processor.

It is another object of the invention to provide a digital doppler processor which may conveniently provide a selected one of several alternative doppler processing modes.

It is yet another object to provide a digital doppler processor which may be conveniently compensated to any desired degree for platform motion and altitude.

A further object is to provide a doppler processor utilizing digital integral filter means, for which the arguments may be conveniently adjusted.

Still another object of the invention is to provide a coherent radar data processor maintaining registration of each of a plurality of discrete targets during a data processing interval without sacraficing range resolution and azimuth resolution of such target data.

Yet a further object is to provide a doppler processor which obviates the need for storing a radar data matrix or plurality of received range trace signals.

These and other objects of the invention will become more fully apparent from the following description, taken together with the accompanying figures in which:

BRIEF DESCRIPTION OF THE DRAWINGS

In the figures, like reference characters refer to like parts.

DESCRIPTION OF THE PREFERRED EMBODIMENTS

Figure 1:
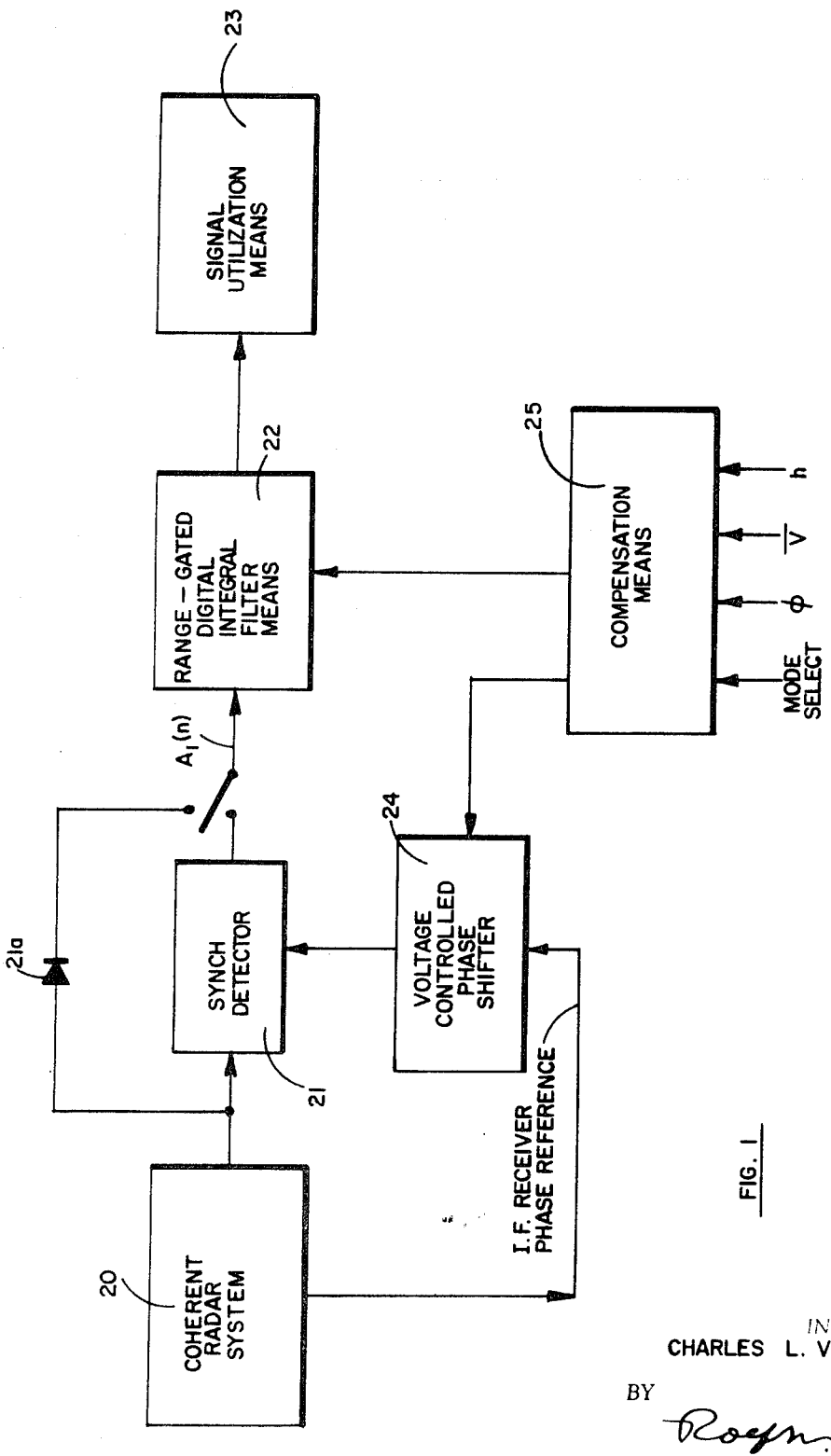
FIG. 1 is a block diagram of a system in which the concept of the invention may be advantageously employed.

Referring now to FIG. 1, there is illustrated a block diagram of a pulsed energy doppler processing system in which the concept of the invention may be advantageously employed. There is provided a coherent radar system 20 providing an intermediate frequency receiver signal as an input to a synchronous detector 21 and a non-coherent video detector 21a, in a manner known per se. There is also provided a digital doppler processor comprising range-gated digital integral filter means 22 adapted to be responsively coupled alternatively to an output of detector 21 and 21a for providing a doppler processed input to signal utilization means 23, which may include a display indicator or the like. Digital integral filter means 22 cooperates to generate the spectral density $|G(f_{ji})|^2$ of the video output $A_i(n)$ of, say, detector 21 at each range bin of interest ($R_i$) for a selected number ($j$) of frequencies corresponding to a doppler bandpass of interest, computing such function for successive intervals corresponding to a preselected number N of system pulse repetition intervals, as will be more fully explained hereafter.

Interposed at a reference input to synchronous detector 21 in FIG. 1 is a voltage controlled phase shifter 24. There is further provided compensatory signalling means 25 drivingly connected to a control input of phase shifter 24 for selectively varying the phase reference input to detector 21. Signalling means 25 may also include means for selectively varying the bandpass of the range-gated integral filter means for each range bin of interest. Phast shifter 24 may include voltage controlled or switched delay elements or other like means known in the art for providing a selected phase shift. The construction and arrangement of element 25 will be described more fully hereinafter.

Figure 2:
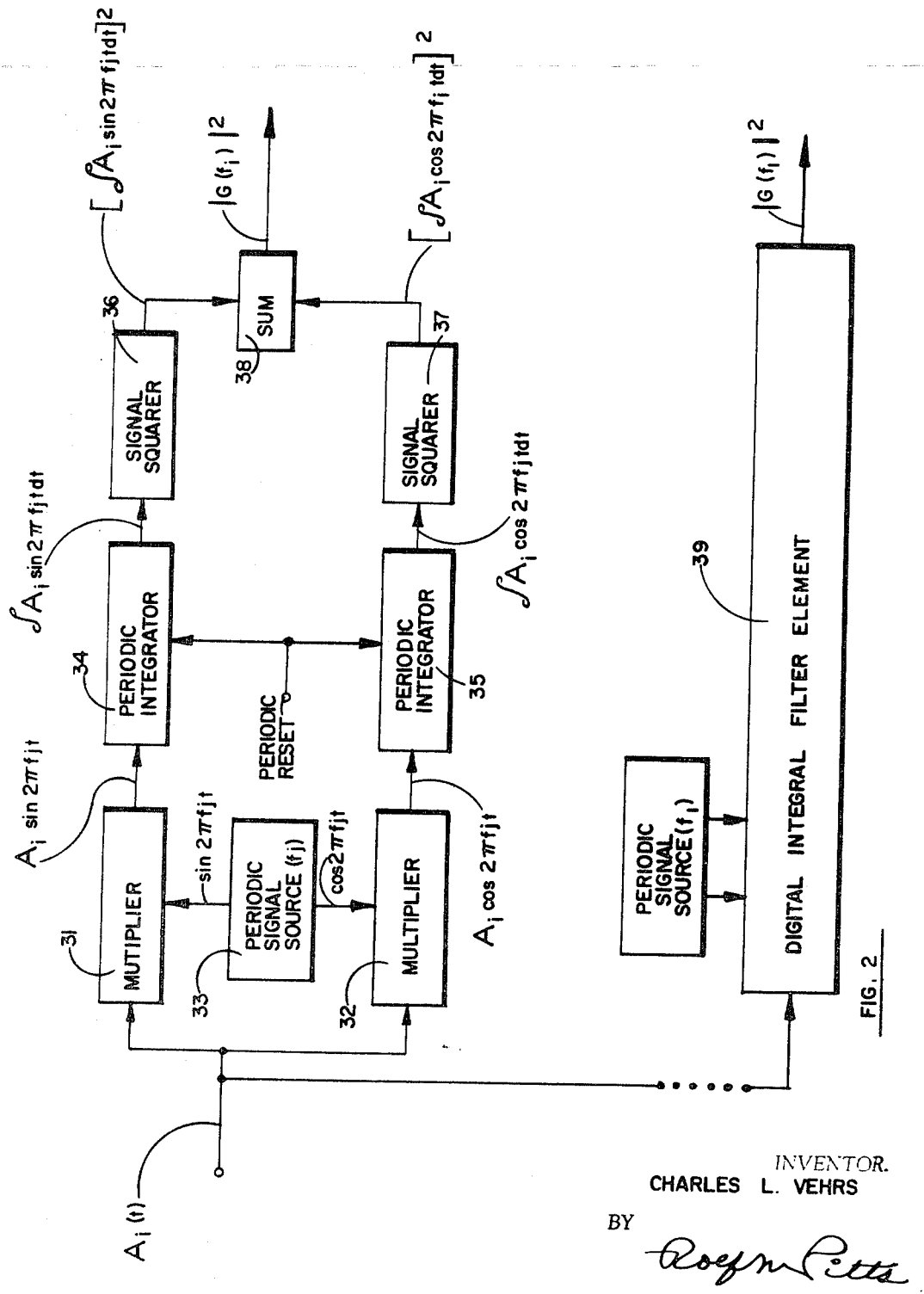
FIG. 2 is an exemplary embodiment of a digital integral filter element.
Figure 3:
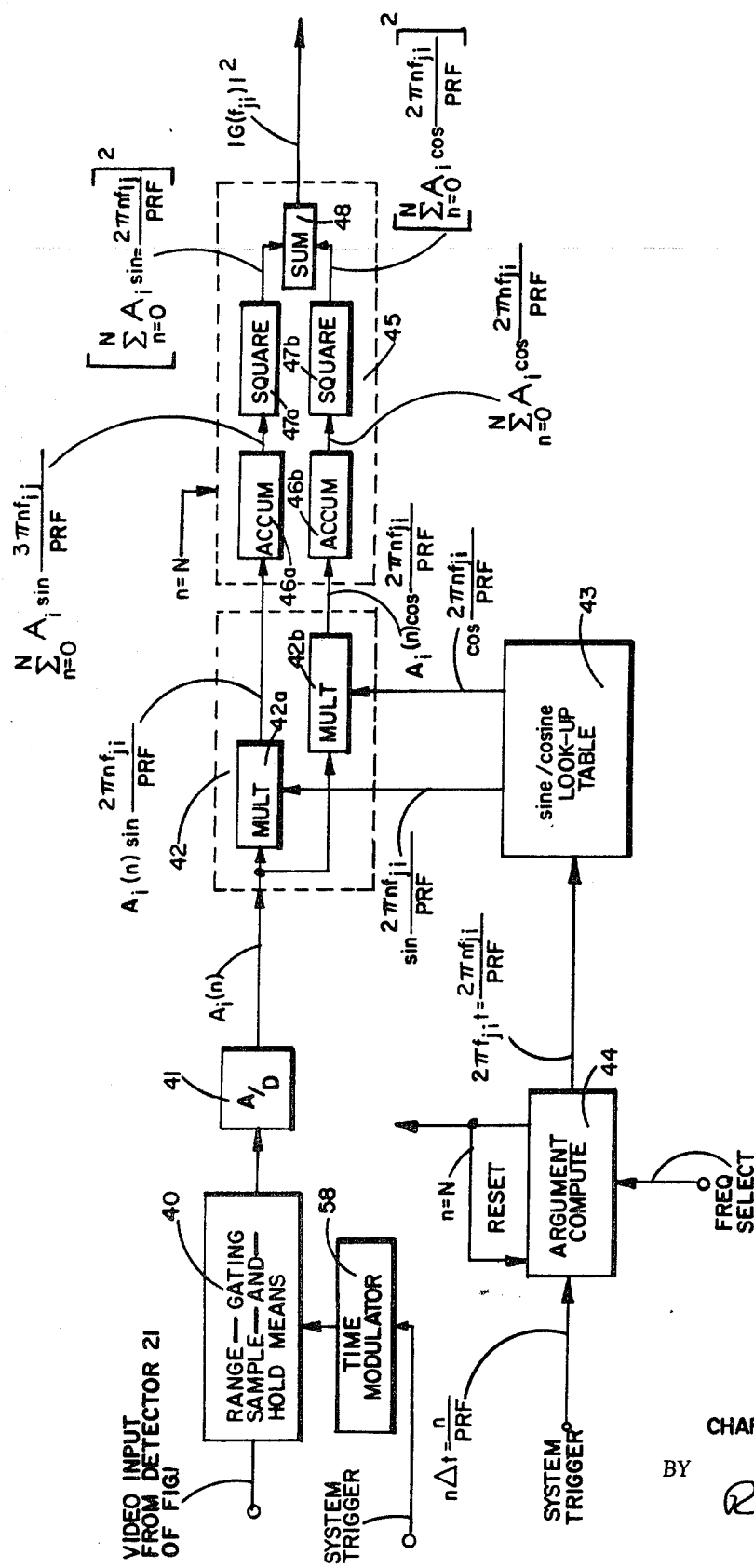
FIG. 3 is a preferred embodiment of a digital integral filter for use in a radar system.

The cooperation of a single digital filter element of the range-gated doppler processor 22 of FIG. 1, for providing a single spectral line of the doppler-processed output for a single bin, may be better appreciated from a consideration of FIGS. 2 and 3.

Referring to FIG. 2, there is illustrated an exemplary arrangement of a digital integral filter element for obtaining the power spectral density of a time-varying input signal $A_i(t)$ for a preselected frequency, $f_j$. A pair of modulators or multipliers 31 and 32 modulate the input signal $A_i(t)$ in response to the outputs from a periodic signal source 33, the modulators being operated in mutual time-phase quadrature. The output of each of modulators 31 and 32 is then integrated with respect to time over a common preselected time interval by a respective one of integrators 34 and 35, and the resultants then squared by a respective one of signal squarers 36 and 37. The sum of the outputs of squarers 36 and 37, as provided by signal combining means 38, is indicative of the power spectral density $|G(f_{ji})|^2$ of the input signal $A_i(t)$ at frequency $f_j$ over the preselected period, $\Delta t > 1/f_j$. Any spectral component of $A_i(t)$ at the sampling frequency $f_j$ will produce an averaged or d-c output level at the outputs of multipliers 31 and 32 which will be integrated by a respective one of integrators 34 and 35. Other spectral components of $A_i(t)$ will result in a time-varying multiplier output, the time-average of which tends to be zero. Accordingly, such other spectral components are attenuated by the signal-averaging function of integrators 34 and 35. At the end of such data processing period, the integrators may be reset and the data processing undertaken for a subsequent occurring interval for $A_i(t)$.

By providing a like plurality of such arrangement 39, each employing a different one of a plurality of successive modulating frequencies, the power spectral density of $A_i(t)$ may be determined for a preselected bandpass. The periodic signal sources may provide periodic two-state (binary-coded) signals, or sinusoidal waveforms, or a digitally coded or quantized waveform, comprising a preselected set of discrete values. A fuller description of the construction and arrangement of a digital integral filter and discussion of the theory of operation thereof is included in U. S. application Ser. No. 275,335 filed Apr. 24, 1963, and assigned to North American Aviation, Inc. Although such arrangement is described in terms of analog circuit elements, it is apparent that digital computing elements may be employed. Further, it is apparent that the input $A_i(t)$ (as shown in FIG. 2) may be the periodically sampled input for a selected range-bin ($i$) of a range-gated video receiver signal, as shown more particularly in FIG. 3.

Referring to FIG. 3, there is illustrated a preferred embodiment of a digital filter element of the doppler processing means 22 of FIG. 1, and employing the principles illustrated in FIG. 2. There is provided a range-gating sample-and-hold means 40 responsively coupled to the output of detector 21 of FIG. 1 for providing a range-gated video signal for a preselected range bin ($i$), which video signal is converted to a digital signal $A_i(n)$ by an analog-to-digital converter 41, each successive pulse repetition interval, $n$.

Figure 4:
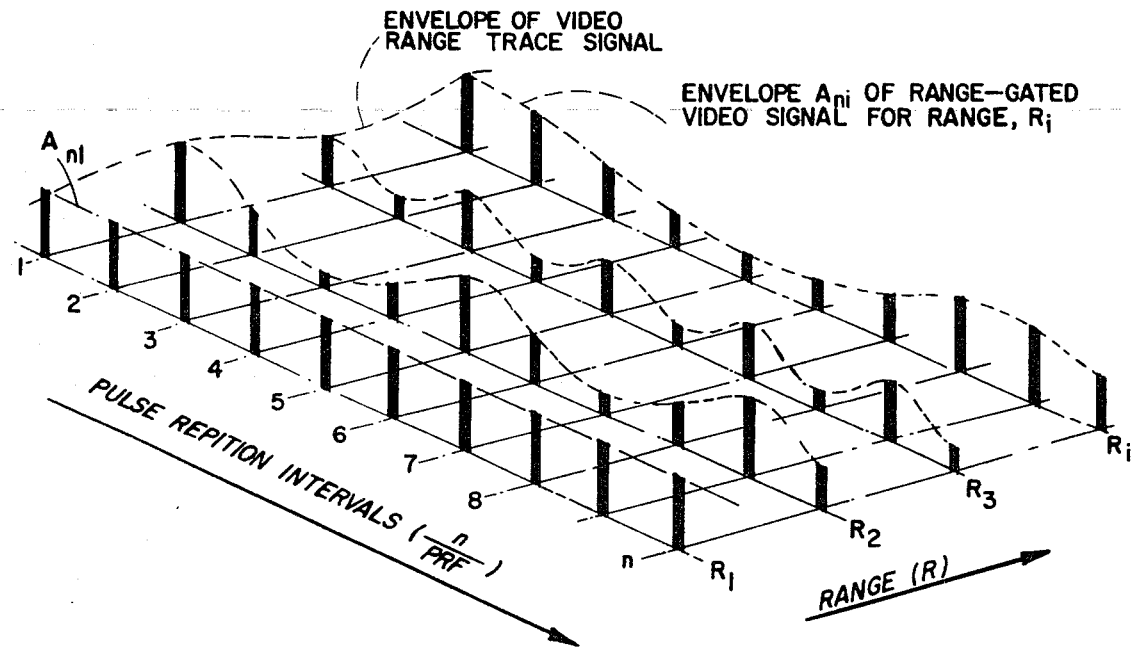
FIG. 4 is a family of representative time histories of range gated video receiver signals employed by the subject invention.

A family of representative time histories of such range-gated video signals $A_i(n)$, occurring at several range-gated intervals $R_i$ or range bins ($i$) within each pulse repetition period and over the interval of a number ($n$) of successive pulse repetition intervals, is shown in FIG. 4. The amplitude variation of the envelope $A_{ni}$ of the range-gated video signal at range $R_i$, for example, represents a doppler shift in those echoes of transmitted signals received from range $R_i$. Where the radar receiver output is clutter referenced (due, alternatively, to utilization of non-coherent detector 21a in FIG. 1 or to compensation of the IF phase reference input to synchronous detector 21 in FIG. 1) then such observed doppler shift at range $R_i$ is due to a target moving relative to the clutter at that range; while the non-varying video envelope $A_{nl}$ at range $R_l$ would indicate the absence of targets moving relative to the clutter at range $R_l$. In any event, it is clear from FIG. 4 that an observation period (or doppler processing period) of many pulse repetition intervals may be required in order to observe the doppler content in the echo signals received from a selected range.

The construction and arrangement of elements 40 and 41 in FIG. 3 are known in the art, one embodiment for which being fully described for example in U.S. application Ser. No. 618,823 filed Feb. 27, 1967, and assigned to North American Aviation, Inc. Accordingly, elements 40 and 41 are shown, for convenience, in block form only in FIG. 3. There is also provided in FIG. 3 digital multiplier means 42 responsively coupled to converter 41 and comprising a first and second multiplier 42a and 42b corresponding functionally to element 31 and 32 of FIG. 2. A modulating or second input of each of elements 42a and 42b is responsively coupled to a set of lookup tables 43, as a source of a respective one of the sine and cosine functions of a periodic time for the argument $2\pi n f_{ji}/PRF$, provided by a periodic multiplying element 44. In other words, for a preselected doppler data processing interval, $N\Delta t = N/PRF$, corresponding to a preselected integer multiple $N$ of system pulse repetition intervals ($1/PRF$, a phase angle or argument ($2\pi n f_{ji}/PRF$) is computed each pulse repetition interval ($n$) for a selected doppler frequency, $f_{ji}$ by computer 44. By looking up (in lookup table 43) the corresponding sine and cosine values of the argument for each pulse repetition interval $n$, the appropriate, mutually time phase quadrature periodic modulations of $A_i(n)$ [$A_i(n)\sin(2\pi n f_{ji}/PRF)$ and $A_i(n)\cos(2\pi n f_{ji}/PRF)$] are provided by multipliers 42a and 42b. These discrete outputs, varied each one ($n$) of a preselected number $N$ of successive pulse repetition intervals, may be seen to correspond to the outputs ($A_i\sin 2\pi f_j t$ and $A_i\cos 2\pi f_j t$) of multipliers 31 and 32 in FIG. 2. The construction, arrangement and cooperation of a lookup table in a digital data processor is well-known in the art, being described for example in U.S. Pat. No. 3,295,102 issued Dec. 27, 1966, to D. A. Neilson for Digital Computer Having a High-Speed Table Look-up Operation. Accordingly, element 43 is shown in block form only in FIG. 3 for convenience in exposition.

Although argument computer 44 is indicated as performing the scaling function, $2\pi/PRF$, for the factor $nf_{ji}$, such function could be incorporated implicitly in the construction of table 43, as is well understood in the art.

The digital outputs of digital multiplier means 42 are further processed by signal integration means such as accumulators 46a and 46b of a digital processor 45 for respectively generating the functions $$\left(\sum_{n=0}^{N} A_{ni} \cos \frac{2\pi n f_{ji}}{PRF}\right) \text{ and } \left(\sum_{n=0}^{N} A_{ni} \sin \frac{2\pi n f_{ji}}{PRF}\right),$$

which are seen to correspond to the functions $\int A_i(t) \cos 2\pi f_j t \, dt$ and $\int A_i(t)\sin 2\pi f_j t \, dt$ at the outputs of integrators 35 and 34 in FIG. 2. Accumulators 46a and 46b are reset in synchronism with counting means 44 at the end of each processing interval $N/PRF$.

The output of each of accumulators 46a and 46b (in FIG. 3) is further processed by digital squaring means 47a and 47b and digital combining means 48 to provide a signal indicative of the function:

$$|G(f_{ji})|^2 = \left[\sum_{n=0}^{N} A_{ni} \cos \frac{2\pi n f_{ji}}{PRF}\right]^2 + \left[\sum_{n=0}^{N} A_{ni} \sin \frac{2\pi n f_{ji}}{PRF}\right]^2,$$

corresponding to the function $|G(f_{ji})|^2$ generated by means of the arrangement of FIG. 2.

Figure 5:
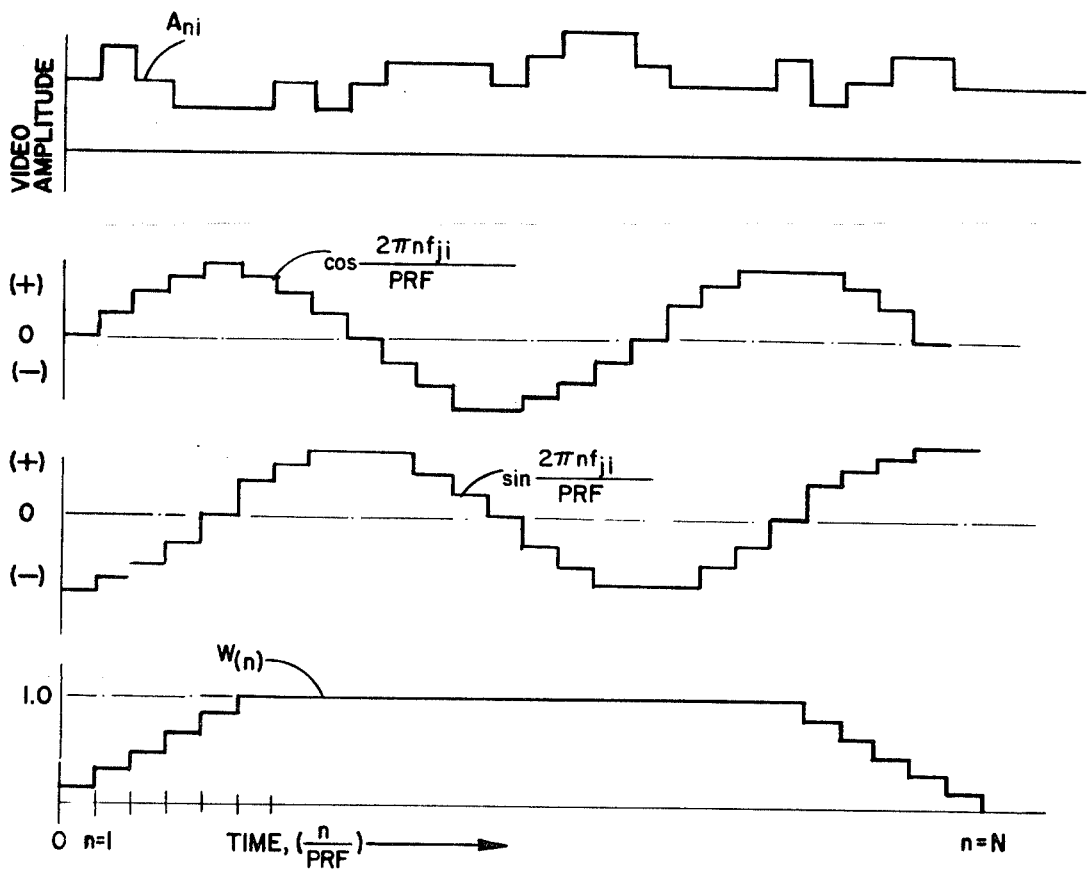
FIG. 5 is a family of time histories of the numerical values of the digitalized functions $A_i(n)$, cos $2\pi nf/\text{PRF}$, sin $2\pi nf/\text{PRF}$, and $W(n)$.
Figure 6:
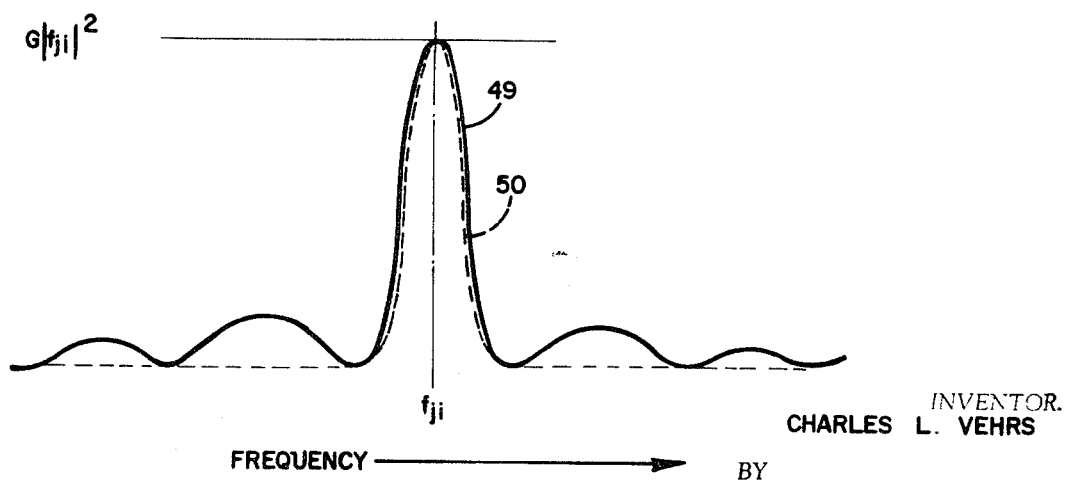
FIG. 6 is a spectral diagram of the weighted and unweighted spectral density function $|G(f_{ji})|^2$, of the response of the device of FIG. 3.

In a sample data type system, which a radar data processor essentially represents, the processing of discrete values $A_{ni}$ for a selected range bin ($i$) by the use of discrete values of the sine and cosine of a selected argument $2\pi n f_{ji}/PRF$ each sampling $n/PRF$ over the processing interval $N/PRF$, as shown in FIG. 5, does not result in a narrow spectral line for the function $|G(f_{ji})|^2$. Instead, the limited resolution provided by such discrete values over the finite processing interval $N/PRF$ may result in undesirable doppler side lobes, as indicated by curve 49 in FIG. 6. In practice, such side lobes may be attenuated by the use of a tapered weighting function $W(n)$ (shown in FIG. 5) for a tapered attenuation of the inputs to accumulators 62a and 62b in FIG. 3 near the beginning and end of each processing interval.

It is to be appreciated that in the argument $2\pi n f_{ji}/PRF$, generated by digital multiplying means 44 of FIG. 3, the doppler frequency $f_{ji}$ represents a scaling factor or constant of proportionality. By varying such constant, the argument is corresponding varied, and the periodicity of the corresponding periodic functions or sine and cosine functions provided by the cooperation of look-up table 43 and argument computer 44 are also changed. Hence, the frequency employed by multiplier means 42 may be conveniently adjusted.

In the range-gated doppler processing system application of FIG. 1, of course, a plurality of frequencies ($j$) are generated for each range bin ($i$) and corresponding to a doppler bandpass of interest for such range, by employing a suitable plurality of the equipment arrangement shown in FIG. 3 as a filter bank. Where a like set of doppler frequencies are to be employed at all range bins, buffer storage means (not shown) may be utilized to permit time sharing of argument computer 44 by the filter banks of all range bins. By employing buffer storage (not shown), a single set of look-up tables 43 may be shared among the plurality of digital integral filter elements of a single filter bank, and even among a plurality of digital integral filter banks. However, where a different set of doppler frequencies are to be employed for each range bin, a separate argument computer may be required for each range-gated filter bank.

The range-gated doppler processor 22 of FIG. 1 has been described in terms of a plurality of banks of digital integral filters, each filter bank corresponding to a range bin of interest. Such technique does not employ or require a radar data storage matrix ($i \times n$) of each element of video data for a given combination of range bin ($i$) and pulse repetition interval ($n$). At most, storage of only $i$ range bins of a single video range trace need be provided. Also, the doppler frequencies of each filter bank may be conveniently varied by merely adjusting the scale factor of the argument computer for each filter element of such bank of filters.

The above-described digital integral filter technique is of special utility in a coherent radar system employed in a high resolution ground-mapping application. In such application, range-gated doppler processing is employed to obtain improved azimuth resolution while retaining the system range resolution inherent in the system pulsewidth: each ground-return range-trace signal is range-gated to provide successive contiguous range bins, each corresponding to the interval of thee transmitted pulse-width. Each range bin signal is doppler processed, whereby each discrete doppler frequency component corresponds to a separate azimuth bin ($j$) within a given range bin ($i$). In other words, instead of storing a radar data matrix of range bin versus pulse repetition interval ($i \times n$), a data matrix of azimuth bin versus range bin is computed for each of a preselected number of range trace signals. The digital integral filter bank for each range bin ($i$) corresponds to a bank of cross-correlators for correlating the video return signal within such range bin with a selected set ($j$) of discrete doppler of frequencies, each frequency corresponding to the predicted doppler shift for a mutually exclusive one of a selected number of azimuth bins within the antenna beamwidth and within such range bin.

Figure 7:
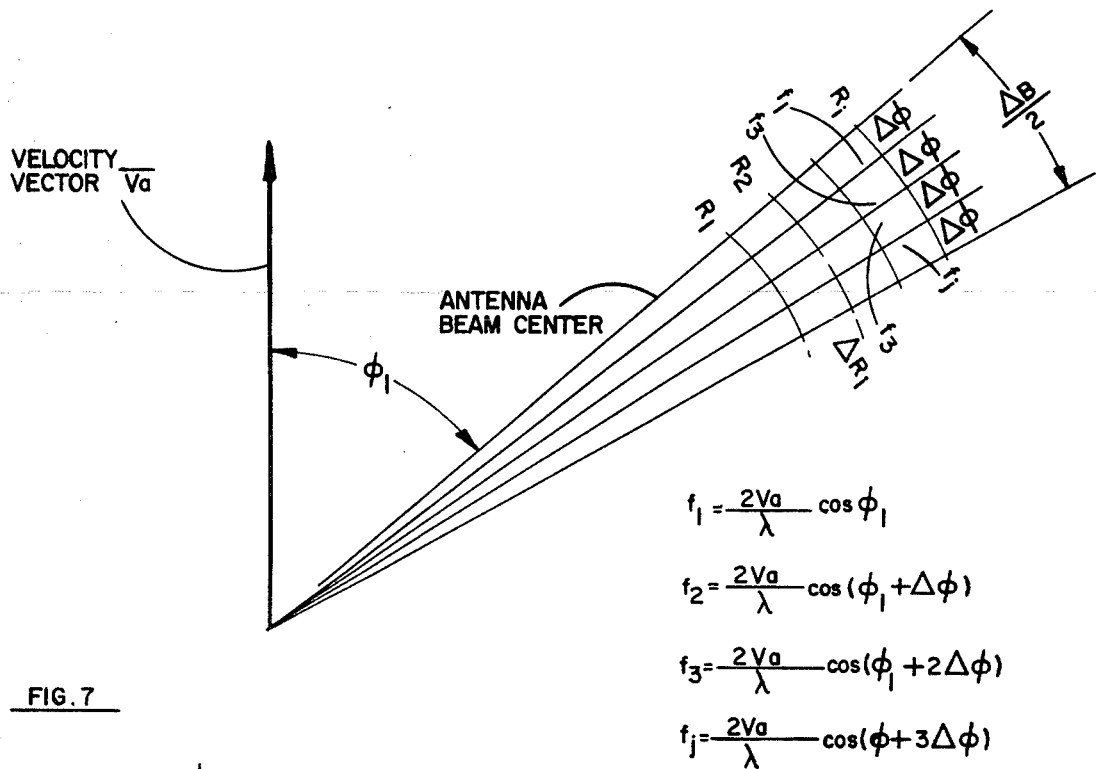
FIG. 7 is an illustration of the (zero altitude) azimuth resolution geometry for a high-resolution ground mapping mode of a doppler processor.

The basic azimuth resolution geometry and analogous frequency resolution (for a zero difference-elevation situation) may be appreciated from FIG. 7 and from the following basic equation for the observed doppler shift, $f_d$:

$$f_d = (2V_a/\lambda) \cos \phi \tag{2}$$

where:
$V_a$ = platform relative velocity
$\phi$ = system (azimuth) look angle, measured relative to platform velocity vector
$\lambda$ = transmitted wavelength Within the illustrated range bin $\Delta R_i$ in FIG. 7, a doppler frequency spread or doppler bandpass of frequencies will be observed from a plurality of individual or discrete scatterers of the composite terrain lying within the beamwidth $\Delta B$, due to differences $\Delta \theta$ in the look angles associated therewith. Such doppler frequencies will vary above and below that doppler frequency $f_d$ observed for the beam center, the lower and higher frequencies being $(2V_a/\lambda) \cos (\phi_1 + \Delta B/2)$ and $(2V_a/\lambda) \cos (\phi_1 - \Delta B/2)$, respectively. Such beam center reference frequency for a given radar system wavelength $\lambda$ may thus be readily determined from sensed platform velocity $V_a$ and an indication of $\phi$ from an antenna angle pickoff. For a selected azimuthal increment or bin size $\Delta \phi$, the direction frequency $f_j$ for a given azimuth bin ($\Delta \phi_j = (j-1)\Delta \phi$), may be determined as: $f_j = (2V_a/\lambda) \cos (\phi_1 \mp k\Delta \phi)$. Accordingly, means may be included for selectively adjusting the direction frequency employed by the agument computer 44 (in FIG. 3) for each digital integral filter element, for variations in $\phi$ and $V_2$, and corresponding to element 25 in FIG. 1.

Because the doppler frequencies observed by a moving airborne radar system are generally much lower than the radar system pulse repetition rate ($PRF$), it is necessary to employ a large number ($N$) of pulse repetition intervals in which to observe the build up of the doppler frequency data, as indicated in connection with the description of FIGS. 3 and 4. However, the precise doppler frequency identified with a given terrain point under surveillance may vary from an initial or starting frequency over the doppler processing or integration interval ($\Delta t = N/PRF$), due to the combined effects of platform motion ($V_a$) and altitude ($h$). Also, the range to the terrain points may change ($\Delta R$) due to platform motion. Therefore, for very high-resolution ground mapping applications, additional compensation is required for each range bin.

Figure 8:
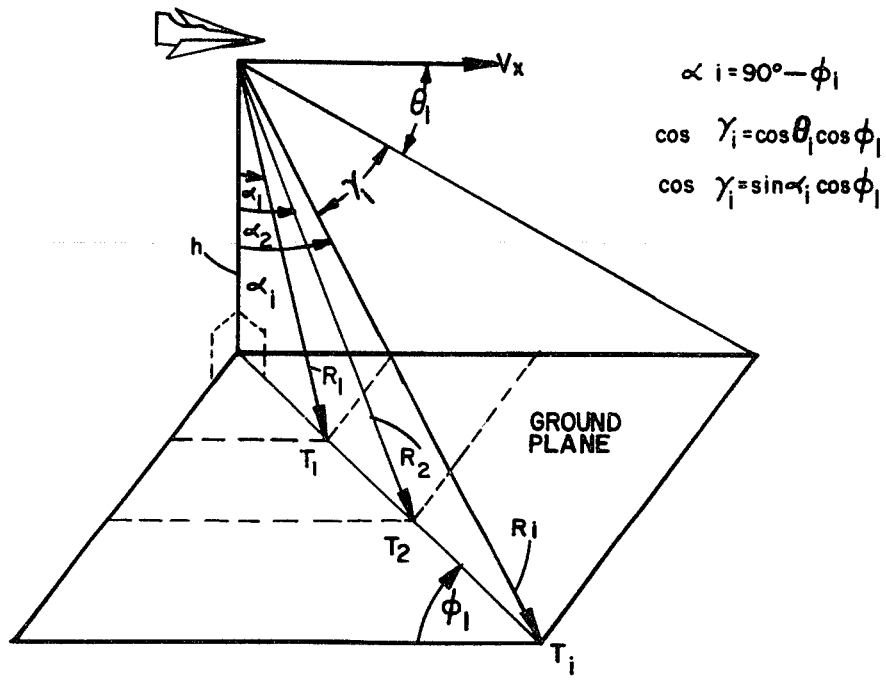
FIG. 8 is an illustration of the geometry of the altitude compensation problem for a high resolution ground mapping mode of a doppler processor.

The requirements for such compensation as a function of target range bin ($i$) may be appreciated from FIG. 8 from which it is appreciated that for an altitude other than zero, the elevation component $\alpha_i$, as well as the azimuth component $\phi_i$, of the resolved look angle for a particular target $T_i$ will attenuate the doppler shift $f_d$:

$$f_{di} = (2V_a/\lambda) \cos \phi \cos (90° - \alpha_i) \tag{3}$$
$$f_{di} = (2V_2/\lambda) \cos \phi_i \sin \alpha_i = f_{do} \sin \alpha_i \tag{4}$$

where
$f_{do} = (2V_2/\lambda) \cos \phi_i$
From the geometry of FIG. 8,
$$\sin \alpha_i = [R_i^2 - h^2]^{1/2}/R_i \tag{5}$$

which may be expanded by the series expression for such trigonometric function, as follows:
$$[i^2 - h^2]^{1/2}R_i = (1 - (h^2/2R_i^2) + (h^4/8R_i^4) \ldots) \tag{6}$$

Substituting Equation (6) in Equation (4)
$$f_{di}(h) = f_{do} (1 - (h^2/2R_i) + (h^4/8R_i^4) \ldots) \tag{7}$$

where
$f_{do}$ = doppler frequency at the antenna beam center for zero elevation angle and
$f_{di}(h)$ = doppler frequency $f_{do}$ corrected for altitude ($h$) at range, $R_i$. The frequencies, $f_{di}(h)$ thus represent altitude-compensated starting frequencies for each range-bin ($i$), with which to start the doppler processing for the processing interval $\Delta t = N/PRF$, including the computation of the remaining direction frequencies of the set ($j$) of direction frequencies ($f_{ji}$) for such range bin ($i$). A less inconvenient manner of mechanizing such compensation, as compared to explicitly computing the starting frequency for each range bin, is to compute such starting frequency for certain selectively spaced or selected ratios of range and altitude, and interpolate between them for other combinations of range and altitude, as shown, for example, in FIG. 9.

Figure 9:
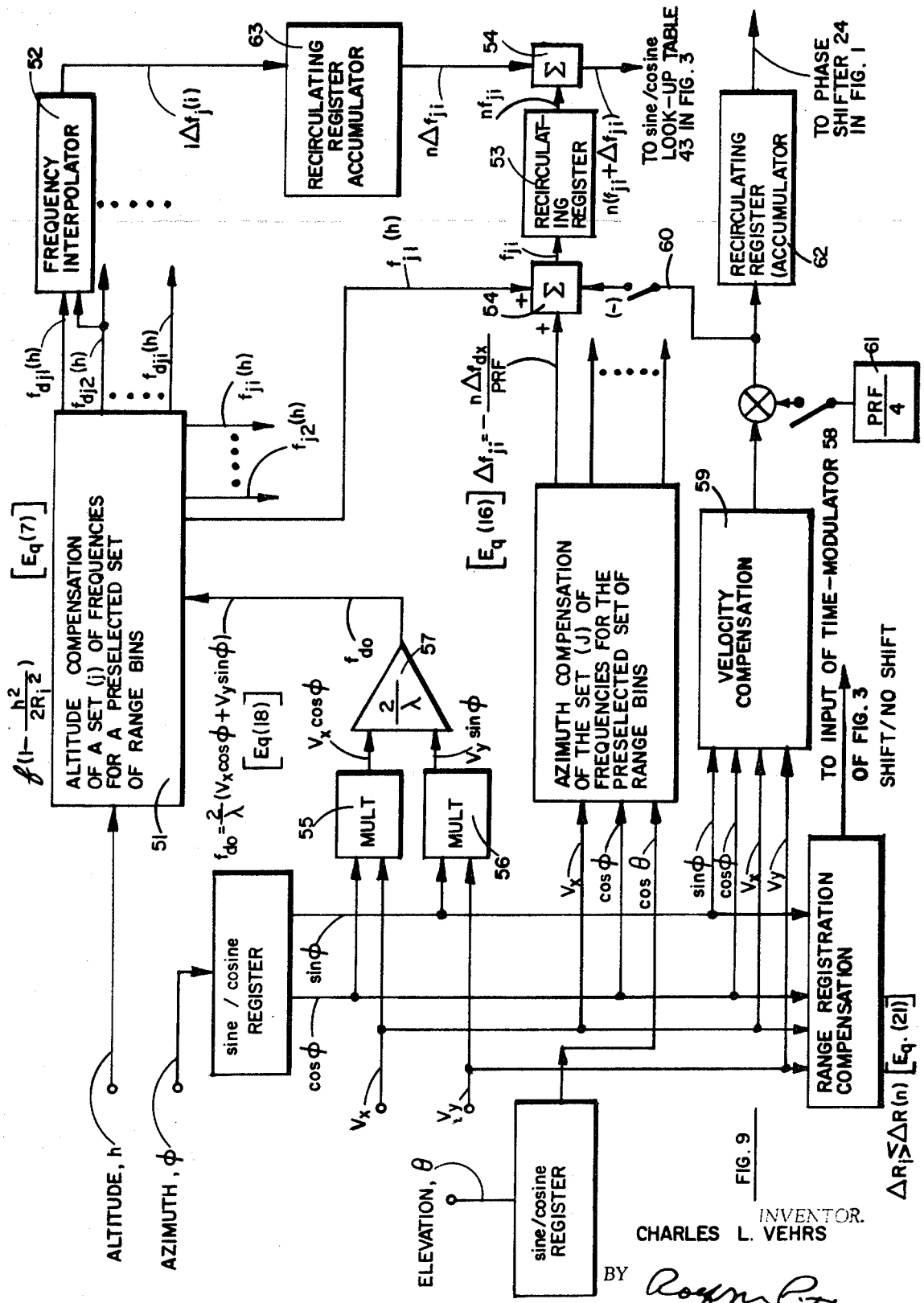
FIG. 9 is a block diagram of the organization of the doppler compensation element of FIG. 3.

Referring to FIG. 9, there is illustrated a preferred organization for mechanizing the altitude compensation provided by Equation (7), a compensated set of frequencies $f_{dji}(h)$ explicitly calculated for each of selected ranges, $R = 5h, 6h, 8h, 16h, 64h$ and $128h$, *and employing interpolation for the compensation of ranges intermediate such selected ranges.*

Figure 10:
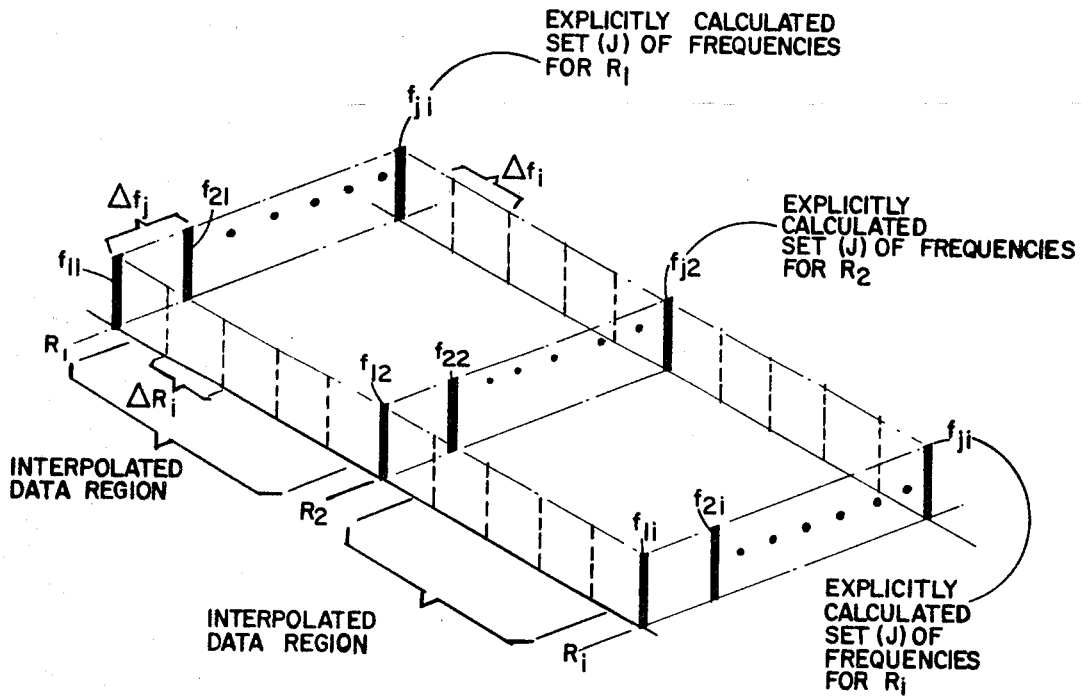
FIG. 10 is a matrix organization of doppler direction frequency versus range bin, illustrating the application of a frequency interpolation technique in the organization of FIG. 9.

Such mechanization of Equation (7) is represented by block element 51, which is responsive to a signal indicative of altitude ($h$) for compensating a second signal indicative of a zero-altitude antenna beam center start frequency, $f_{do}$. The output of block element 51 is a set ($j$) of azimuth frequencies $f_{dji}(h)$ for each range of a set of selectively spaced discrete ranges ($R_i$), such frequencies being compensated for the change in doppler shift at such discrete ranges due to altitude ($h$). Such a matrix of ($j$) direction frequencies versus range bin are illustrated in FIG. 10 for three exemplary discrete ranges, $R_1$, $R_2$ and $R_i$. The outputs of each pair of successive range bins are employed by a respective frequency interpolator 52 for determining the corresponding set of direction frequencies for each of the range bins intermediate the two discrete ranges of a range pair. For example, interpolator 52 (in FIG. 9) employs the difference between $f_{i1}$ (at $R_1$) and $f_{i2}$ (at $R_2$), divided by the number of range bins ($\Delta i$) intervening between $R_1$ and $R_2$, to determine $\Delta f_j$, the frequency increment per range bin in the region between $R_1$ and $R_2$. The multiplication of the set of $j$ direction frequency differences by recirculation within the interpolators 52 a number of times ($\Delta i$) corresponding to the number of range bins between $R_1$ and $R_2$, generates a set of the appropriate interpolation frequencies upon each circulation.

The interpolation direction frequencies for successive range-bins, $i\Delta f_j = \Delta f_j(i)$, may then be combined in sequence with the corresponding altitude-compensated direction frequencies for that discrete range ($R_1$) from which the range interpolated values are computed, in order to obtain a set of interpolated frequencies. By recirculating the explicitly computed direction frequencies for discrete range $R_1$ in a recirculating register 53 each pulse repetition interval in synchronism with the recirculation of a similar recirculation of the output of interpolator 52 in a separate register 63, prior to combining each set of explicitly computed frequency and associated frequency change at summing means 54, the argument $n(f_{ji} + \Delta f_{ji})$ is computed. Hence, elements 53, 54 and 63 in FIG. 9 also cooperate as an argument computer. A corresponding interpolator, recirculating registers and summing means for each pair of discrete range bins thus enables completion of the matrix ($ji$) of ($j$) arguments for ($i$) range bins represented by FIG. 10, and correspond to argument computer 44 of FIG. 3. The factor, $2\pi/PRF$, omitted in the calculation, may be accounted for in the construction of look-up table 43, as is understood in the art.

Figure 11:
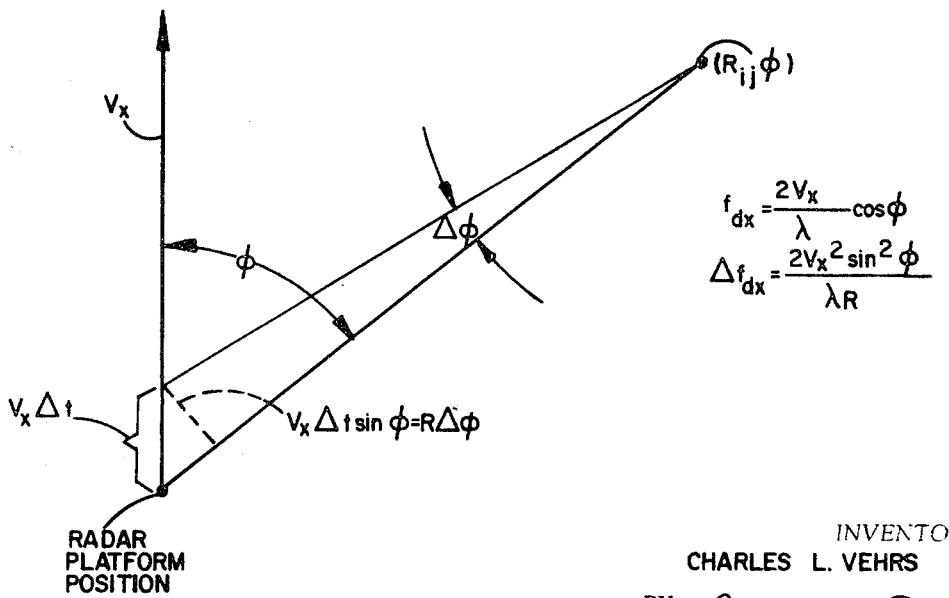
FIG. 11 is an illustration of the geometry of the velocity compensation of the (altitude-compensated) doppler direction frequencies processed by the arrangement of FIG. 9.

The change in doppler frequency ($\Delta f_{ji}$) occurring to the (altitude-compensated) starting frequencies due to platform motion during the processing interval $N/PRF$ must also be determined, for correction of the doppler frequencies each ($n$) pulse repetition interval during the period $N/PRF$. This azimuth compensation of doppler frequency due to aircraft motion may be appreciated from a consideration of FIG. 11, and is determined from the basic doppler equation as follows:

$$f_{dx} = (2V_x/\lambda) \cos \phi \tag{8}$$

(Note the similarity of $f_{dx}$ in Equation (8) to $f_{do}$ in Equation (4)) Differentiating the basic doppler frequency $f_{dx}$ with respect to look angle $\phi$:

$$\Delta f_{dx}/\Delta \phi = df_{dx}/d\phi = -(2V_x/\lambda) \sin \phi \tag{9}$$

Transposing to solve for $\Delta f_{dx}$:

$$\Delta f_{dx} = [-(2V_x/\lambda) \sin \phi] \Delta \phi \tag{10}$$

Figure 12:
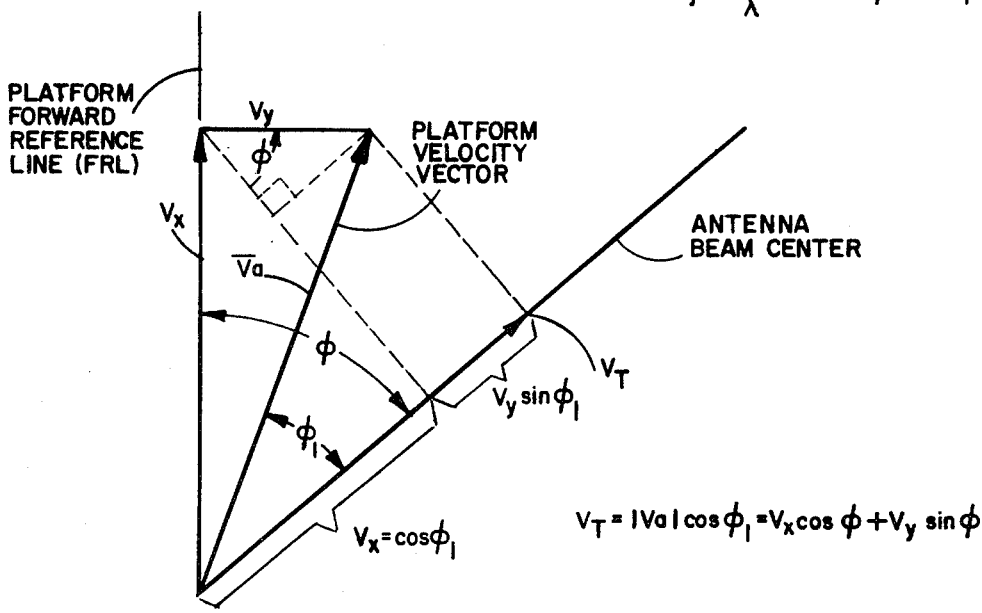
FIG. 12 is an illustration of the geometry of the platform motion compensation problem due to the presence of lateral velocity components.

From inspection of FIG. 12, $$V_x \Delta t \sin \phi = R \Delta \phi \tag{11}$$

Rearranging:

$$\Delta \phi = V_x \Delta t \sin \phi / R \tag{12}$$

Substituting Equation (12) in Equation (10):

$$\Delta f_{dx} = -2V_x \sin \phi / \lambda \times V_x \sin \phi \Delta t / R_i \tag{13}$$

$$\Delta f_{dx} = -2V_x^2 \sin^2 \phi \Delta t / \lambda \lambda R \tag{14}$$

Substituting the term $f_o$ for $-2V_x/\lambda$ and the term $1/PRF$ for $\Delta t$:

$$\Delta f_{dx} = f_o (V_x \sin^2 \phi / R\ PRF) \tag{15}$$

where such correction is for motion occurring over a single pulse repetition interval ($1/PRF$).

Although it is necessary to make this calculation only once each integration interval, $N/PRF$, the value $f_{dx}$ represents the correction to be added each ($n$) pulse repetition interval. Thus, the total correction applied to the start frequency at a subsequent pulse repetition interval ($n$) is:

$$\Delta f_{dx}(n) = n\Delta f_{dx} \tag{16}$$

In a preferred mechanization, this may be effected by a recirculating register which adds such correction to the previous value each successive pulse repetition interval. For convenience, the azimuth motion compensation term $\Delta f_{dx}(n)$, being a function of range, may be computed (in block 65 of FIG. 9) for those same sample ranges for which the altitude compensation term is calculated. Hence, the platform motion, or velocity, compensation term and the altitude compensation term for like altitudes may be combined (by combining means 154 in FIG. 9), prior to interpolation for intermediate ranges, whereby additional interpolation computing means need not be required.

Equations (7) and (16) for altitude compensation ($f_{di}(h)$) and azimuth compensation $\Delta f_{dx}(n)$ are adequate for a high resolution ground mapping application in the absence of platform acceleration. If, however, the radar platform is subjected to accelerations resulting in a lateral velocity component ($V_y$), then a further correction to the doppler frequencies may be necessary. The determination of such additional correction may be appreciated from FIG. 12 and is as follows:

$$f_{dy} = (2V_y/\lambda) \sin \phi \tag{17}$$

Such compensation for $V_y$ need only be calculated once every processing interval $N/PRF$, and included in the computation of starting frequency, $f_o$, computed prior to altitude compensation of the starting frequency. In other words, by combining Equations (8) and (16) the zero-altitude starting frequency ($f_{do}$) is made to include the effect of resolving the velocity vector $\overline{V_a}$ to an arbitrary forward reference line (FRL), corresponding to the direction of $V_x$.

$$f_{do} = 2/\lambda (V_x \cos \phi + V_y \sin \phi) \tag{18}$$

The mechanization of such latter expression, using the resolved velocity components ($V_x$ and $V_y$) obtained from an inertial sensing system or navigation system, is fairly straightforward and obvious, as indicated by the illustrated arrangement of multipliers 55 and 56 and gain-weighted summing means 57 in FIG. 9.

The digital phase shifter 24 (of FIG. 1) adjusts or varies the phase of the reference input to synchronous detector 21 in response to an input from element 25 in FIG. 1 (e.g., the cooperation of velocity compensation means 59 and recirculating register 62 in FIG. 9) substantially in accordance with Equation (18). The resulting rate of the phase change ($d\phi/dt = \dot{\phi} = \omega(t)$) corresponds to a periodicity or frequency modulation which compensates for the radar platform motion (and may be further compensated for a selected range interval of interest), whereby the video output of synchronous detector 21 is clutter referenced. In other words, the reference frequency input to detector 21 corresponds to the centroid of the IF clutter spectrum, and the zero frequency or d-c component of the detector video output represents the clutter content (if any) at the antenna beam center.

Figure 14:
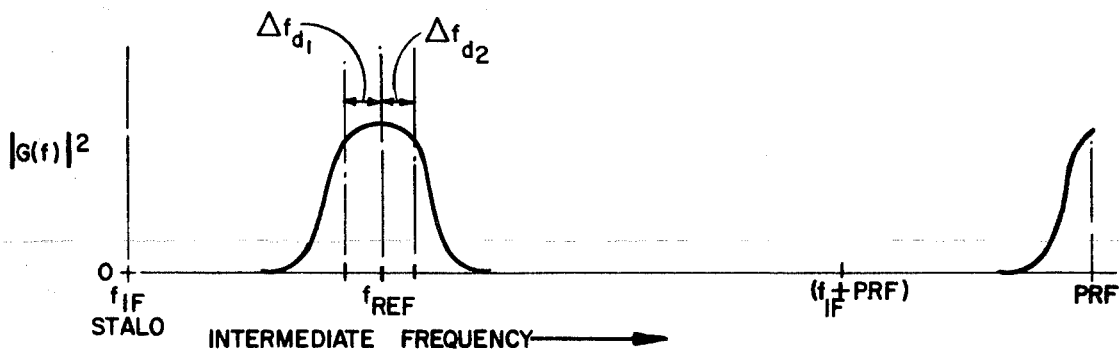
FIG. 14 is a spectral diagram of an intermediate frequency clutter spectrum, frequency-translated to a reference frequency.
Figure 15:
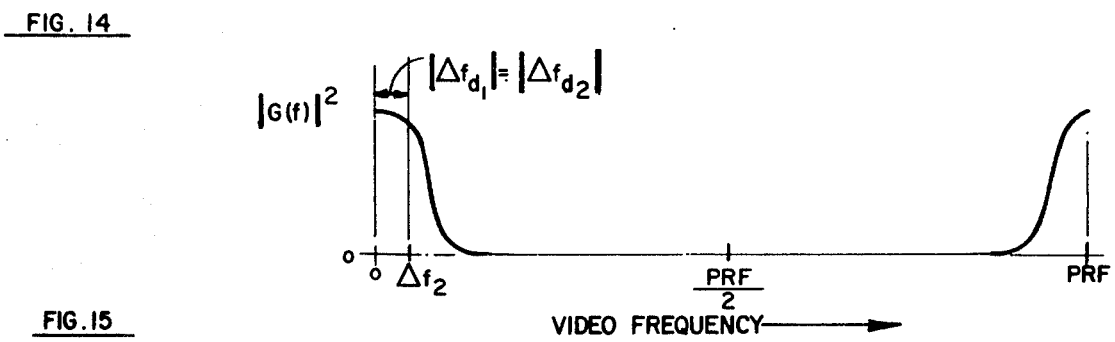
FIG. 15 is a spectral diagram of the video detection of the clutter-referenced spectrum of FIG. 14, showing the ambiguity of clutter frequencies occurring above and below the clutter spectrum centroid due to fold-over.
Figure 16:
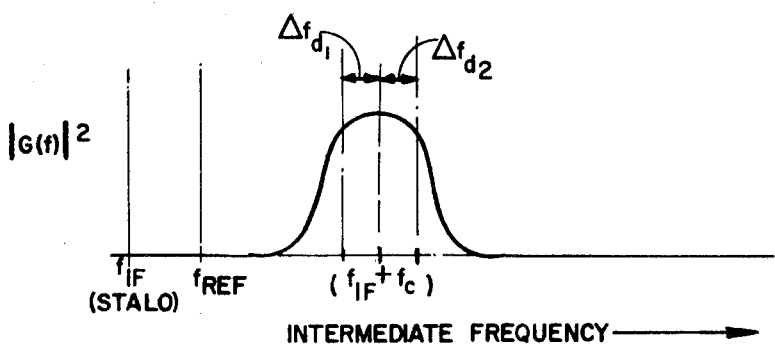
FIG. 16 is a spectral diagram of an intermediate frequency clutter spectrum translated in frequency by a bias amount from the intermediate frequency reference of an intermediate frequency receiver stage.
Figure 17:
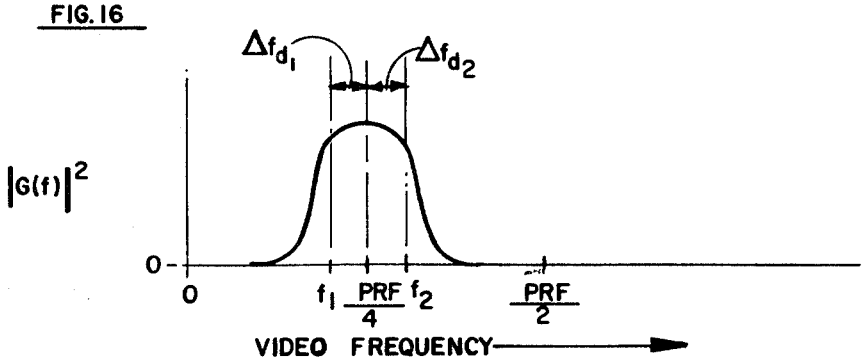
FIG. 17 is a spectral diagram of the video detection of the clutter spectrum of FIG. 16, showing the preservation of the difference sense of the component clutter frequencies relative to the clutter center frequency.

However, in order to avoid the ambiguities between clutter doppler returns occurring from the left and right hand sides of the antenna beam center in a high resolution ground mapping mode, (e.g., negative and positive differences in doppler frequency relative to the beam center doppler shifted clutter return) due to fold-over of a clutter-referenced signal (as shown in FIG. 14 and 15), a further frequency bias component may be included in the frequency bias applied to the synchronous detector reference input by phase shifter 24. This additional bias, $\Delta f = PRF/4$, (selectively provided by element 61 in FIG. 9) references the video clutter spectrum at $PRF/4$; rather than folding the clutter spectrum about the centroid thereof at zero frequency or d-c. In this way, doppler shifted frequencies relative to and above the clutter center frequency may be distinguished from those below the clutter center frequency, whereby terrain points to one side of the antenna beam center may be distinguished (in azimuth) from those on the other side (as shown in FIGS. 16 and 17).

The presence of the frequency bias provided by the cooperation of element 59 (and element 61) of FIG. 9 with elements 58 of FIG. 3 may be accounted for in the computation of the frequencies employed by the argument computer of the doppler processor, by subtracting such frequency bias from the explicitly computer doppler frequencies as indicated by the cooperation of output line 60 with signal combining means 154 in FIG. 9. To the extent that like functions (such as that of Equation (18)) are employed in the computation of the phase control output of velocity compensation element 59 and for the computation of the altitude compensated start frequencies of element 51, the mechanization of block elements 51 and 59 may employ common equipment. The illustration of separate functional blocks in FIG. 9 is intended to relate only to a functional organization of compensation element 25 of FIG. 1.

The doppler frequency compensation described by Equations (7), (15) and (17) provides (1) a set, $f_{ji}$, of frequencies computed for each range bin of interest, and (2) corrections, $-n\Delta f_{ji}$, to the starting frequencies computed for each pulse repetition interval ($N/PRF$) during the integration period $N/PRF$, whereby such azimuth bin within a given range bin is focused in frequency or distinguished throughout the integration interval. Such azimuth bin within such range bin may not, however, correspond to a fixed terrain element of a ground map due to changes in range of such element over the processing interval, $N/PRF$. Accordingly, compensation to effect range registration of signal returns from such terrain element may also be required.

Figure 13:
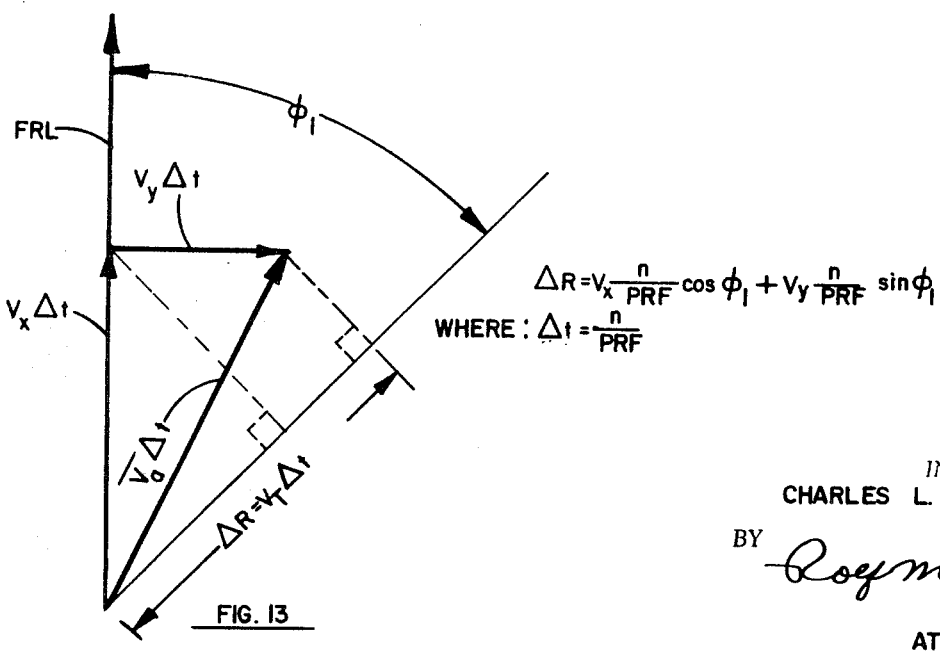
FIG. 13 is an illustration of the range registration problem due to platform motion.

The change in range per pulse repetition interval ($\Delta R/\Delta t = \Delta R \times PRF$) of a terrain element at substantially an azimuth look angle $\phi$ (relative to the forward reference line or FRL of the platform) may be determined by observation from FIG. 13 as:

$$\Delta R/\Delta t \approx \dot{R} = (V_x \cos \phi + V_y \sin \phi) \quad (19)$$

Rearranging and substituting $1/PRF$ for $\Delta t$:

$$\Delta R = (V_x \cos \phi + V_y \sin \phi) \, 1/PRF \quad (20)$$

The $\Delta R$ correction term is computed once each processing interval $N/PRF$ and then added each pulse repetition interval:

$$\Delta R(n) = n\Delta R \quad (21)$$

When $\Delta R(n)$ exceeds a range resolution increment (corresponding to the range-gated interval of each range bin) during the doppler processing interval $N/PRF$, then the value $A_{ni}$ of the range gated video (for a given range bin) could be taken from the preceeding range bin for the remainder of the doppler processing interval. Such range registration function may be mechanized by means of a computing element 62 (in FIG. 9) cooperating to selectively control a shift register (not shown) in which each range-gated single successive range-trace signal is temporarily stored. Alternatively, a time modulator 58 or otherr voltage controlled delay may be interposed at the trigger input to the range-gated means 40 of FIG. 3. In this way, a preselected delay or time bias ($T_o$) may be selectively reduced ($T_o - \Delta t$), whereby a given range-gated interval or range bin represents a correspondingly lesser range.

The determination of the cross-correlation signals for each of the 10 azimuth direction frequencies (within the antenna beamwidths) for each of 500 range bins provides computed data for an exemplary data matrix of 5,000 elements. At the end of an integration interval ($N/PRF$), the spectral density computations for each azimuth direction (or azimuth resolution bin) may be gated out as a synthetic range-trace signal for utilization by a display indicator or other signal utilization means, whereby a high-resolution ground map display may be generated over that number of successive integration intervals required to scan a terrain sector of interest.

In the described system, the mechanization can be expanded to include a second synchronously detected signal channel having a synchronous detector operated in quadrature time phase with the first detector 21 of FIG. 1, if additional signal-to-noise improvement is required or if (in a high resolution ground mapping mode) a lesser $PRF$ is desired and to avoid the necessity of frequency biasing the synchronous detector reference by the amount, $PRF/4$.

Although the device of the invention has beeen described in terms of a ground mapping application, the utility of the invention is not so limited. It is to be readily understood that the doppler processing technique disclosed may be employed in those doppler processing modes not requiring the degree of compensation illustrated for the high resolution ground mapping mode. However, it is to be appreciated that the cross-correlation technique of the digital doppler processor disclosed readily lends itself to conveniently incorporating any form of compensation desired for a particular application.

For example, a squint mode may be provided, wherein a fixed look angle is employed, rather than a scanned antenna. Thus, because the antenna beamwidth dwells upon the surveillance area a greater portion of the processing interval, the inherent resolution obtainable is greater. Accordingly, a higher degree of motion compensation for such squint mode may be required in some respects.

Alternatively, an air-to-air mode may be provided in which a range-gated clutter-referenced video signal is doppler processed to distinguish a moving target from a clutter background. In such mode, the prediction of the clutter frequencies within the antenna beamwidth may be employed to determine a bandwidth of frequencies not to be employed by the correlators of the doppler processor, whereby such clutter content is rejected.

Figure 18:
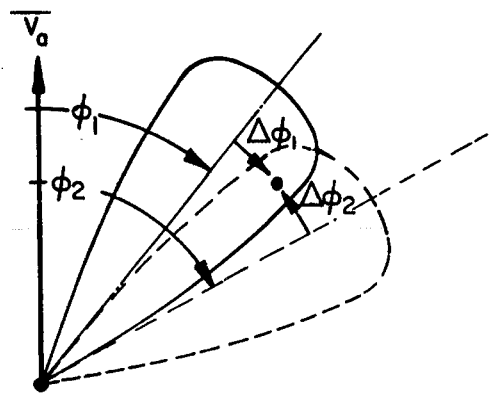
FIG. 18 is a diagram illustrating the look angle difference between a selected moving target and the beam center of a scanning antenna for two alternate orientations.
Figure 19:
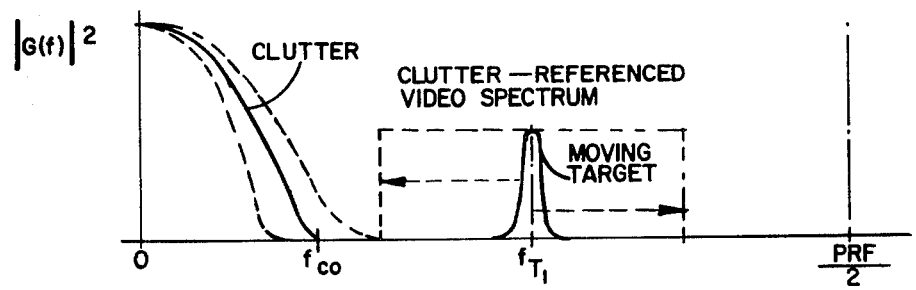
FIG. 19 is a spectral diagram illustrating an exemplary spectral envelope of a video-detected, clutter-referenced moving-target, due to the scanning of the antenna beam center of FIG. 18.
Figure 20:
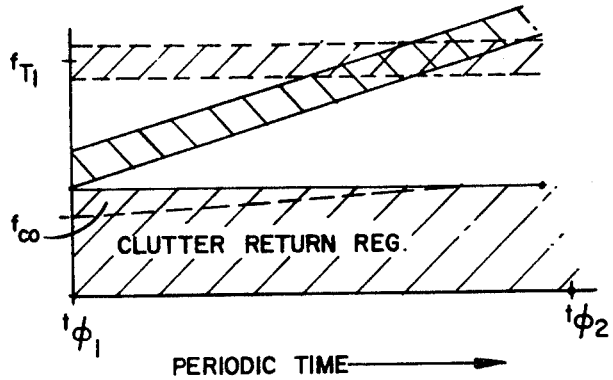
FIG. 20 is a family of time histories, illustrating the frequency-modulation imposed upon a video detected clutter-referenced moving target, due to the scanning of the antenna beam center of FIG. 18.

In an air-to-air search mode (e.g., scanning antenna mode), the look angle difference between a moving target at a given range and the center of the clutter viewed at such range, changes with the scan angle of the scanning antenna, as shown in FIG. 18. Such change of the magnitude and sense of the look angle difference between the clutter reference employed and the moving target of interest results in a periodic frequency modulation of the moving target at the periodicity of the periodically scanned antenna, as shown in FIGS. 19 and 20. The corner frequency $f_{co}$ of the clutter patch will similarly undergo a change with changes in antenna scan angle. Where, of course, the target velocity is low enough and the range of frequency modulation great enough, the target spectrum may become periodically submerged in the clutter spectrum. Accordingly, such computed value of the corner frequency may be used to inhibit those lesser values of programmed argument frequencies from being presented to the look-up tables.

The concept of the subject invention is compatible with the utilization, in an air-to-air mode, of a delay line canceller for reducing the total energy of a clutter-referenced clutter spectrum, which is to be rejected by an AMTI bandpass filter bank. Such delay-line canceller may be of the analog type and interposed between the output of detector 21 (of FIG. 1) and the input of analog-to-digital converter 41(of FIG. 3) or may be of the digital type and interposed between the output of element 41 and input of element 42 in FIG. 3. In other words, because the signal level to be processed by multiplier 42 of FIG. 3 may be reduced by precancellation of a large portion of the energy to be rejected by the digital correlator, improved signal resolution within the correlator bandpass would be provided by a given number of bits of information, in handling such lower energy level. Alternatively, the same resolution (as that obtained in the absence of such clutter-canceller) may be provided by a reduced number of bits and for a corresponding reduction in digital equipment and cost.

Accordingly, there has been disclosed a digital doppler processor employing digital integral filter elements. By means of adjusting the arguments of such elements, phase and frequency compensation may be conveniently effected as desired for a selected one of a number of coherent and non-coherent doppler processing modes. More particularly a coherent, azimuthally-scanning radar system, utilized in an airborne ground-mapping mode, may be made to provide a higher degree of resolution in the real-time mapping of an azimuthally scanned sector.

Such improved resolution results, in part, by the doppler discrimination of the range-gated direction frequencies within the beamwidth of each range bin of a range-gated range trace signal, and the cross-correlation of each resolution element of the map with a range-gated predicted doppler frequency over the integration interval, or doppler processing period. Frequency compensation or focussing during the integration interval allows the continuation of the correlation process for each resolution element over the interval. Because such large number of resolution elements may be cross-correlated within one scan interval of the scanning antenna, a high resolution map is continuously provided for use in more accurate piloting and guidance of aircraft and for the delivery of airborne weaponry against a hostile territory.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a pulsed energy type ranging system, digital doppler processing means for processing the range-gated video signals received in a given range bin over a preselected number of pulse repetition intervals of said system to determine the power spectral density thereof for a set of selected discrete doppler frequencies corresponding to a selected bandwidth, and characterized by digital integral filter means for each discrete frequency for providing an output indicative of the cross-correlation function of the video received signal for a given range bin with each of said discrete frequencies;

adjustable periodic signalling means responsive to a system trigger of said pulsed energy system for providing periodic control signals indicative of a selected discrete frequency for modulation control of the integral filter means; and adjusting means for adjusting the frequency and phase of the periodic control signals.

2. In a radar system including an intermediate frequency stage coherent receiver having a synchronous detector responsive to a source of an intermediate frequency reference, digital doppler processing means for processing signals received by said receiver and comprising digital integral filter means having an input responsively coupled to an output of said synchronous detector;

voltage-controlled phase-shift means interposed between said input of said synchronous detector and said output of said intermediate frequency reference source and having a control input; and compensatory signalling means drivingly connected to said control input of said phase shift means for selectively varying at least one of the phase and frequency of the reference input to said synchronous detector.

3. The device of claim 2 in which said compensatory signalling means further includes means for varying the bandpass of said digital integral filter means.

4. The device of claim 2 in which said compensatory signalling means includes means for concomitantly varying said phase of said reference source and the bandpass of said digital integral filter means in a preselected relationship.

5. In a radar system including an intermediate frequency stage coherent receiver having a synchronous detector responsive to a source of an intermediate frequency reference, digital doppler processing means for processing signals received by said receiver and comprising digital integral filter means having an input responsively coupled to an output of said synchronous detector;

voltage-controlled phase-shift means interposed between said input of said synchronous detector and said output of said intermediate frequency reference source and having a control input; and compensatory signalling means drivingly connected to said control input of said phase shift means for selectively varying at least one of the phase and frequency of the reference input to said synchronous detector, said digital integral filter means including means responsive to the system trigger of said system for generating the sine and cosine functions of the argument $2\pi n f'_{ji}/PRF$ where:

$PRF$ = system pulse repetition frequency $n$ = a successive one of a preselected number $N$ of system pulse repetition intervals $f'_{ji}$ = a selected one ($j$) of a set of doppler frequencies for a given range bin ($i$), multiplying means responsive to said first mentioned means for obtaining the products of the amplitude $A_{ni}$ of the receiver signal associated with such range bin ($i$) and pulse repetition interval ($n$) and each of said sine and cosine functions, signal integrating means responsive to said multiplying means for generating the functions $$\left(\sum_{n=0}^{N} A_{ni} \sin \frac{2\pi n f_{ji}}{PRF}\right) \text{ and } \left(\sum_{n=0}^{N} A_{ni} \cos \frac{2\pi n f'_{ji}}{PRF}\right)$$

and signal squaring and summing means responsive to said signal integrating means for generating a signal $G(f'_{ji})^2$ indicative of the power spectral density relation, $$|G(f'_{ji})|^2 = \left(\sum_{n=0}^{N} A_{ni} \sin \frac{2\pi n f'_{ji}}{PRF}\right)^2 + \left(\sum_{n=0}^{N} A_{ni} \cos \frac{2\pi n f'_{ji}}{PRF}\right)^2.$$

6. The device of Claim 5 in which said compensatory signalling means includes means for varying the selected doppler frequency $f'_{ji}$ by a selected amount $n\Delta f_{ji}$ from a preselected starting frequency $f_{ji}$ in the argument $2\pi n f'_{ji}/PRF$.

7. The device of claim 5 in which said compensatory signalling means includes means for varying the selected doppler frequency $f'_{ji}$ from a preselected starting frequency $f_{ji}$ associated with each range bin $R_i$ as a function of radar platform altitude $h$ substantially in accordance with the relationship $f'_{ji} = f_{ji} \sqrt{R_i^2 - h^2}/R_i$.

8. The device of claim 5 in which said compensatory signalling means includes means for varying the selected doppler frequency $f'_{ji}$ from a preselected starting frequency $f_{ji}$ associated with each range bin $R_i$ as a function of radar platform altitude substantially in accordance with the relationship $f'_{ji} = f_{ji} (1 - (h^2/2R_i^2) + (h^4/8R_i^4))$.

9. The device of claim 5 in which said compensatory signalling means includes means for varying the starting frequency $f_{ji}$ of each range bin $R_i$ for each integration interval $N/PRF$ by the amount $\Delta f_{di}$ as a function of platform velocity $V$ in accordance with the relationship, $\Delta f_{di} = fo\,(V\sin^2\theta/R_i$, where $\theta$ is the look angle between the platform velocity vector and a boresight axis of the radar system.

* * * * *